(12) United States Patent
Jennex (10) Patent No.: US 10,183,537 B2
(45) Date of Patent: Jan. 22, 2019

(54) SAFETY DEVICE FOR A TRAILER HITCH AND COMBINATION THEREOF

(71) Applicant: JENNEX AND SONS MECHANICAL DESIGN INC., Quesnel (CA)

(72) Inventor: George William Jennex, Quesnel (CA)

(*) Notice: Subject to any disclaimer, the term of this patent is extended or adjusted under 35 U.S.C. 154(b) by 0 days.

(21) Appl. No.: 15/927,888

(22) Filed: Mar. 21, 2018

(65) Prior Publication Data

US 2018/0304707 A1    Oct. 25, 2018

(30) Foreign Application Priority Data

Apr. 20, 2017   (CA) ...................................... 2964955

(51) Int. Cl.
*B60D 1/28*   (2006.01)
*B60D 1/58*   (2006.01)
*B60D 1/60*   (2006.01)

(52) U.S. Cl.
CPC ............... *B60D 1/28* (2013.01); *B60D 1/583* (2013.01); *B60D 1/60* (2013.01)

(58) Field of Classification Search
CPC ............. B60D 1/28; B60D 1/583; B60D 1/60
USPC ........................................................ 280/507
See application file for complete search history.

(56) References Cited

U.S. PATENT DOCUMENTS

| | | |
|---|---|---|
| 3,549,173 A | 12/1970 | Stanfield |
| 3,677,564 A | 7/1972 | Kothmann |
| 3,759,548 A | 9/1973 | Kothmann |
| 4,032,171 A | 6/1977 | Allen et al. |
| 4,082,311 A * | 4/1978 | Hamman ............... B60D 1/065 280/507 |
| 4,169,611 A * | 10/1979 | Smith ..................... B60D 1/155 280/482 |
| 4,208,065 A | 6/1980 | Hansen |
| 4,459,832 A * | 7/1984 | Avrea ....................... B60D 1/60 280/507 |
| 4,577,884 A | 3/1986 | Harris |
| 4,593,264 A | 6/1986 | Engle |
| 4,799,706 A * | 1/1989 | Myers ...................... B60D 1/02 280/504 |
| 4,844,497 A * | 7/1989 | Allen ....................... B60D 1/07 280/477 |
| 5,087,064 A | 2/1992 | Guhlin |

(Continued)

OTHER PUBLICATIONS http://hitchitsafe.com/ retrieved Feb. 17, 2017 (4 pages).

*Primary Examiner* — Jacob D Knutson
(74) *Attorney, Agent, or Firm* — Baumgartner Patent Law; Marc Baumgartner (57) ABSTRACT

A safety device for attachment to a ball mount of a trailer hitch is provided, the safety device comprising: a tower, the tower including a housing, the housing including a front, a back and a central aperture; a tongue, the tongue slidably mounted in the housing normal to the tower and including a distal end, a proximal end, an underside, a top and at least two tongue apertures, the tongue apertures extending between the underside and the top; and a pin, the pin releasably retained in the central aperture and one tongue aperture to releasably retain the retention tongue in a position. A combination for retaining a trailer socket and a trailer hitch assembly are also provided. A method of releasably retaining a trailer on a trailer hitch is further provided.

7 Claims, 6 Drawing Sheets

(56) References Cited

U.S. PATENT DOCUMENTS

| | | | | |
|---|---|---|---|---|
| 5,433,467 A * | 7/1995 | Easterwood | ............ | B60D 1/60 |
| | | | | 280/504 |
| 5,934,698 A * | 8/1999 | Despain | ................ | B60D 1/46 |
| | | | | 280/490.1 |
| 6,155,587 A * | 12/2000 | Milazzo | ................ | B60D 1/06 |
| | | | | 280/457 |
| 6,386,572 B1 | 5/2002 | Cofer | | |
| 6,802,523 B1 | 10/2004 | Profitt | | |
| 6,932,376 B1 * | 8/2005 | Profitt | .................... | B60D 1/065 |
| | | | | 280/432 |
| 6,969,085 B2 * | 11/2005 | Causey, Jr. | ............ | B60D 1/065 |
| | | | | 280/432 |
| 6,971,661 B1 | 12/2005 | MacKarvich | | |
| 7,334,809 B2 | 2/2008 | Coy | | |
| 7,347,441 B2 * | 3/2008 | Rosario | ................ | B60D 1/065 |
| | | | | 280/507 |
| 7,431,320 B2 * | 10/2008 | Madden, III | ............ | B60D 1/28 |
| | | | | 280/432 |
| 8,444,169 B1 | 5/2013 | Katz | | |
| 9,707,811 B2 * | 7/2017 | Columbia | ................ | B60D 1/07 |

\* cited by examiner

SAFETY DEVICE FOR A TRAILER HITCH AND COMBINATION THEREOF

CROSS REFERENCE TO RELATED APPLICATIONS

This application is related to, and claims the benefit of, Canadian Patent Application No. 2,964,955, entitled SAFETY DEVICE FOR A TRAILER HITCH AND COMBINATION THEREOF, filed Apr. 20, 2017. The above-identified priority patent application is incorporated herein by reference in its entirety.

FIELD OF THE INVENTION

The present technology is directed to a safety device for a trailer hitch and a modified trailer hitch that reduces or eliminates the potential of the trailer socket disengaging from the ball. More specifically, it is tower with a moveable retention tongue that physically blocks the socket from disengaging, while allowing full freedom of rotational motion about the ball.

BACKGROUND OF THE INVENTION

Although trailer hitches of the ball and socket type include a jaw pivotable on a horizontal axis for locking the ball to the socket, they are known to disengage during transit. This can have devastating results, ranging from destruction of the trailer and its load to personal injury or death. Should the ball and socket disengage, the trailer is held only by a safety chain. Safety chains and cables are considered necessary because a hitch ball and hitch ball coupler must have universal motion in order for the towing vehicle and trailer to negotiate around curves and over hills, whereupon the longitudinal axes of the towing vehicle and trailer are not aligned and additional vertical and lateral forces might be applied to the trailer hitch. This relative motion between the trailer and the towing vehicle sometimes causes the hitch ball coupler to separate from the hitch ball. Also, there are times when the load carried by the trailer tends to cause the hitch ball coupler to lift upwardly away from the hitch ball, and there are other times when the application of the brakes of the towing vehicle applies so much stress to the hitch ball and hitch ball coupler that separation of the trailer from the towing vehicle becomes more likely. There are many instances where the safety chain is broken and the trailer is released from the tow vehicle. For these reasons, attempts have been made to increase the safety of the trailer hitch.

For example, U.S. Pat. No. 8,444,169 discloses a trailer hitch coupler to couple a trailer to a trailer hitch includes a socket adapted for receiving a trailer hitch ball; a clamp associated with the socket and operable for engaging the trailer hitch ball; a sensor operatively connected with the socket and operable for determining a distance between an inner surface of the socket and an outer face of the trailer hitch ball when the trailer hitch ball is positioned within the socket; a clamp prevention device operatively connected with the socket and with the clamp and operable to prevent engagement of the clamp with the trailer hitch ball; and a release mechanism operatively connected with the sensor and the clamp prevention device and operable to release the clamp prevention device to allow the clamp to engage the trailer hitch ball when the sensor communicates a desired hitch condition. The object of this invention is to provide a sensor to alert a user that the wrong sized socket has been used with the ball. It does not prevent the ball and socket from disengaging and releasing the trailer from the vehicle during transit.

U.S. Pat. No. 7,334,809 discloses a trailer hitch assembly that better secures a trailer to a vehicle trailer hitch. By restricting vertical travel of the trailer coupling, a hitch ball on a draw bar is better engaged by the trailer coupling as any vertical dislodgement of the trailer coupling from the hitch ball is restricted by the underlying trailer hitch assembly. The underlying trailer hitch assembly cannot travel upward when locked into position as the draw bar obstructs its upward travel, thus preventing the trailer coupling from disengaging the hitch ball. The trailer hitch assembly is lockably, pivotable away from the underside of the draw bar in order to allow controlled disengagement of the trailer coupling from the hitch ball. The trailer hitch assembly may act as a support when placed in the vertical or downward position with a wheel, pad, or skid providing support for the accompanying trailer and its load. Additionally, a new trailer hitch ball system is detachably attachable to the draw bar without a shank, nut, or washer. This is simply a dolly wheel and jack that can be used to raise and lower the trailer neck, when the trailer is not being towed. It does not address the problem of the hitch disengaging while the trailer is being towed.

U.S. Pat. No. 6,971,661 discloses a safety cable cartridge 20 that is connected between a towing vehicle 12 having a hitch ball and a trailer 10 including a tubular coupler housing 16 mounted to a trailer draw bar. The cartridge is self contained and includes a cartridge housing 28 for positioning in the elongated opening of the coupler housing, at least one safety cable assembly 30 positioned in said cartridge housing, and spring 20 surrounds the cable 31 and biases the distal end 30 of the cable toward the cartridge housing. This does not stop the hitch ball and socket from disengaging.

U.S. Pat. No. 6,802,523 discloses a safety fastener for ball and socket hitches of medium to heavy vehicles provides a base defining a channel to fit about a hitch tongue beam of a towing vehicle with holes in the base to receive the fastening bolt of a hitch ball to fasten the base and hitch ball on the hitch tongue. The base carries at least one collar for adjustable positioning of at least one vertical fastener arm by a pin fastener. The vertical fastener arm carries a horizontal fastening beam extending over the hitch beam carried by the ball to prevent removal of the hitch from the ball. Species provide one or two vertical fastening arms carrying the fastening beam. The pin fastener may carry a lock to prevent unauthorized removal of the hitch from the ball. A horizontal member is positioned to contact the upper surface of the socket, hence this design would interfere with the rotation of the socket about the ball. Further, the vertical member would limit movement of the tongue of the trailer about the ball, such as would occur during a turn. This design therefore is not for preventing disengagement of the trailer when in transit.

U.S. Pat. No. 6,386,572 discloses a safe and secure trailer hitch for use with a towing vehicle. More particularly, but not by way of limitation, the present invention relates to an optical guiding trailer hitch device which allows an operator of a towing vehicle to easily, accurately, and safely attach a trailer to the towing vehicle. Additionally, the optical guiding trailer hitch device may further include an assembly for aligning the trailer in a horizontal plane relative to the towing vehicle. The present invention in conjunction with a trailer may be used for the transportation of a boat, a camper, a mobile home, or any such object which may be moved from one place to another place using a trailer and a towing vehicle. This does not address the problem of the hitch disengaging while the trailer is being towed.

U.S. Pat. No. 4,593,264 discloses a dual trailer hitch warning system for use with a ball and socket trailer hitch including an electrically operated alarm system for signaling a loose coupling of the socket member on the ball member. A switch is mounted within the ball member which energizes an alarm relay circuit when the ball switch operates due to a loose coupling to complete an alarm circuit between the automobile battery and the horn. The warning system also includes a tampering relay circuit adapted to provide an alarm signal if an attempt is made to disengage or short out the alarm circuit or if the socket and ball member are deliberately uncoupled. This does not address the problem of the hitch disengaging while the trailer is being towed.

U.S. Pat. No. 4,577,884 discloses a device for preventing unauthorized intentional uncoupling or accidental uncoupling of a trailer from a towing vehicle. The threaded shaft of the ball slides through an upper housing allowing the upper housing to contain the shoulder of the ball so that the ball and upper housing can be mounted to a tow bar by inserting the threaded shaft of the tow ball through the aperture in a tow bar and then screwing a flanged nut onto the threaded shaft. A lower housing is then placed around the flanged nut and bolted to the upper housing so that the tow bar and the flanged portion of the flanged nut are sandwiched between the upper and lower housings. There is a yoke which encircles the shank of the tow ball, the dimensions of which make it impossible for it to slide over the ball. There is a locking hat which is placed over the trailer tongue ball socket having legs extending vertically downward allowing it to be locked to the yoke. Once in locked position, the trailer hitch cannot be disengaged without first unlocking and removing the locking hat. Although the locking hat and yoke are purported to not limit the inherent rotation of the socket about the ball, it can be seen from the drawings that they clearly do, hence this would not be suitable for use when towing a trailer.

U.S. Pat. No. 3,759,548 discloses a safety trailer hitch in which a ball is mounted on the towing vehicle and a ball clamping coupling is mounted on the trailing vehicle. A member carrying a finger is arranged on the towing vehicle to be positioned with the finger overlying the coupling to prevent the coupling from detaching from the ball even if unlocked. The finger is mounted to be swung out of the way as required to permit the coupling to be disconnected from the ball. As shown, the finger presses on the upper surface of the socket, holding the socket on the ball. This would impede rotation of the socket relative to the ball. In a modified form of the invention a yoke is mounted on the towing vehicle for swinging to a position overlying the coupling to prevent the coupling from being detached from the ball. This would interfere with the rotation of the ball in the socket when towing a trailer. Further, there may be potential for the socket to jam in the attachment or disengage from the ball as it is urged upward during braking.

U.S. Pat. No. 4,032,171 discloses a theft deterrent trailer hitch lock to obstruct removal of the socket portion of a trailer hitch from engagement with a trailer hitch ball mounted on a tow bar secured to a towing vehicle. The device includes a right angular-shaped base having a first flange underlying the hitch ball and bolted to the tow bar by bolts having an upstanding end portion projecting above the upper limit and on opposing sides of the trailer hitch socket portion. The upstanding flange of the angle base is pivotally connected with a top member vertically movable toward and away from the upper limit of the trailer hitch socket portion and having apertures therein receiving the upper ends of the base flange bolts. A lockable bar, slidably supported by the top member along its edge opposite the pivotal connection, is provided with an aperture mating with an aperture in the top member for receiving the bolt of a lock. This would interfere with the rotation of the ball in the socket when towing a trailer. Further, there may be potential for the socket to jam in the attachment or disengage from the ball as it is urged upward during braking.

U.S. Pat. No. 3,549,173 discloses a safety trailer device having an alternate connection between the motor vehicles and the towed vehicle comprising a channel member with aligned apertures in opposite ends thereof such that a ball connector may be mounted in the lower end and a safety connector may be secured to the other end vertically above the ball connector. It is disclosed that the safety connector is connected directly over the centre of the ball. In one embodiment, an eyebolt is adjustably mounted above the socket to prevent upward movement of the socket a sufficient distance to disengage the ball without removing the eyebolt. As before, this is located directly above the centre of the ball. The deficiency in this design is that a threaded connection as is used for the eyebolt is subject to corrosion, and therefore, would cease to function very quickly if used in salt water. It would also be difficult to feed the socket and tongue under the top member that retains the eyebolt. It would also not be robust enough to withstand the force of the tongue lifting as the bend in the connector is a weak point. Further, there may be potential for the socket to jam in the attachment or disengage from the ball as it is urged upward during braking.

U.S. Pat. No. 3,677,564 discloses a safety trailer hitch in which a yoke is secured to the tow bar of the trailer and to the hitch of the towing vehicle to prevent the trailer from becoming disconnected should the socket portion on the trailer become detached from the ball. The yoke may be easily disconnected from the trailer hitch when disconnecting the trailer from the towing vehicle. In a modified form of the invention a finger on the trailer hitch is arranged to be swung into a position overlying the socket to prevent the socket from detaching from the ball. When disconnecting the trailer the finger is swung out of the way to permit the socket to be lifted off of the ball. The deficiency in this design is that a threaded connection as is used for the finger bolt is subject to corrosion, and therefore, would cease to function very quickly if used in salt water. It does not look as though it would be robust enough to stop the socket from disengaging. Further, there may be potential for the socket to jam in the attachment or disengage from the ball as it is urged upward during braking.

U.S. Pat. No. 4,208,065 discloses a base is secured to a mounting member extending from a towing vehicle and having an upstanding ball element. A retention member carried by the base is selectively movable to a position over a socket element which extends from a towed vehicle and which is detachably engaged downwardly over the ball element. The retention member limits the upward travel of the socket element and maintains engagement of the coupling. The retention member is held in position by lock means. A resilient member is disposed between the base and the retention member to prevent the retention member from rattling against the base. The retention member is hinged to the base. Upward force on the retention member could shear the clevis pins, allowing the trailer to be disengaged. Other disclosed embodiments include a U-shaped member that sits around the ball, and a threaded member that can be wound down onto the socket. This would be difficult to use as there is little space between the top of the U and the ball for placement of the socket. Also, as it is threaded, corrosion could be an issue. Upward force on the retention member could shear the pin, allowing the trailer to be disengaged. Further, there may be potential for the socket to jam in the attachment or disengage from the ball as it is urged upward during braking.

U.S. Pat. No. 5,087,064 discloses an anti-theft, safety device for use with ball and socket trailer hitches comprising a base plate clamped to the tow bar near the ball, a post attached at one end to the base plate that extends vertically from the tow bar adjacent to the ball and socket, an upper plate through which the post extends that moves vertically and rotates with respect to the post, a bushing with an opening in register with the opening in the upper plate through which the post extends, both the post and the bushing having transverse openings through which a lock bolt may be passed when the holes are aligned so that the upper plate will be held over the socket to prevent the socket from being disconnected from the ball. The upper plate is located such that it will interfere with the rotation of the socket in relation to the ball. Further, there may be potential for the socket to jam in the attachment or disengage from the ball as it is urged upward during braking.

A hitch attachment for theft prevention and safety is at http://hitchsafe.com/ This device has a hinged gate that is locked in place overtop the socket once the trailer has been located on the hitch. It requires a padlock to lock it in place. While this may deter thieves, it would not prevent the trailer from detaching in the case of an accident, sudden braking or the like. There is also no consideration of the relation between the hinge attachment and the ball and socket, hence the turning radius may be compromised. Further, there may be potential for the socket to jam in the attachment or disengage from the ball as it is urged upward during braking.

What is needed is a safety device for attachment to a trailer hitch that allows the hitch ball and socket to have unimpeded rotational motion while reducing or eliminating the potential for the hitch ball and socket to disengage. The device would preferably be easy to use and would require little modification to the hitch. It would be preferable if it had few moving parts and was resistant to corrosion. It would be preferable if it did not interfere with the process of attaching the trailer to the hitch. It would be preferable if it could be added to existing trailer hitches, or could be supplied as part of a new hitch assembly. It would be preferable if the device was designed to take into consideration the effect of hard braking on the relationship between the ball and socket, as the socket may become jammed if the tolerances are too small or the socket may still disengage if the tolerances are too large.

SUMMARY OF THE INVENTION

The present technology is a safety device for device to a trailer hitch that allows the hitch ball and socket to have unimpeded rotational motion while reducing or eliminating the potential for the hitch ball and socket to disengage. The device is easy to use and requires little modification to the hitch. It has few moving parts and is resistant to corrosion. It does not interfere with the process of attaching the trailer to the hitch. It can be added to existing trailer hitches, or can be supplied as part of a new hitch assembly. The device is designed to take into consideration the effect of hard braking on the relationship between the ball and socket, as the socket may become jammed if the tolerances are too small or the socket may still disengage if the tolerances are too large.

In one embodiment, a safety device for attachment to a ball mount of a trailer hitch is provided, the safety device comprising: at least one tower, the tower including a housing, the housing including a front, a back and a central aperture; a tongue, the tongue slidably mounted in the housing normal to the tower and including a distal end, a proximal end, an underside, a top and at least one tongue aperture, the tongue aperture extending between the underside and the top; and a pin, the pin releasably retained in the central aperture and the at least one tongue aperture to releasably retain the retention tongue in an operational position.

The safety device may further comprise a second tongue aperture, the second tongue aperture to retain the retention tongue in a retracted position.

In the safety device, the housing may be mounted proximate a top end of the tower.

In the safety device, the distal end of the tongue may be housed substantially within the housing in the retracted position.

In the safety device, the distal end of the tongue may be coterminous with the front of the housing in the retracted position.

In the safety device, the proximal end of the tongue may be coterminous with the back of the housing in the extended position.

In the safety device, the pin may include a pin aperture for releasably retaining an R-clip.

The safety device may further comprise the R-clip.

In the safety device, the tower may further include a right leg and a left leg, each leg for attaching to a side of the ball mount.

In the safety device, the safety device may comprise a first, second and third tower, the second and third towers including a second and third housing, respectively, and at least one long leg extending therebetween, the first tower affixed and normal to the at least one long leg.

The safety device may further comprise a tether, the tether releasably retaining the retention tongue to the tower.

In another embodiment, a combination for releasably retaining a trailer is provided, the combination comprising a ball mount, a ball mounted on the ball mount, the ball including a central axis, a top and a horizontal axis of rotation, and a safety device, the safety device mounted on the ball mount proximate the ball and comprising: a tower, the tower including a housing, the housing including a front, a back and a central aperture; a tongue, the tongue slidably mounted in the housing normal to the tower and including a distal end, a proximal end, an underside, a top and at least one tongue aperture, the tongue aperture extending between the underside and the top; and a pin, the pin releasably retained in the central aperture and the at least one tongue aperture to releasably retain the retention tongue in an operational position.

In the combination, the safety device may include a tether, the tether releasably retaining the retention tongue to the tower.

In the combination, the retention tongue may further comprise a second tongue aperture, the second tongue aperture to retain the safety device in a retracted position.

In the combination, the position may include an extended position and a retracted position.

In the combination, the distal end of the tongue may be aligned with the central axis of the ball in the extended position.

In the combination, the distal end of the tongue may be substantially housed in the housing in the retracted position.

In the combination, the distal end of the tongue may be coterminous with the front of the housing in the retracted position.

In the combination, the tower may include a right leg and a left leg, the legs attached to the ball mount such that the tongue is in parallel relation to the ball mount.

In the combination, the safety device may comprise a first, second and third tower, the second and third towers including a second and third housing, respectively, and at least one long leg extending therebetween, the first tower affixed and normal to the at least one long leg.

In the combination, the tower may be located on the ball mount such that the distal end of the tongue and the top of the ball define a space, the space being about 5 mm to about 10 mm wide.

In another embodiment, a trailer hitch assembly is provided, the assembly comprising a ball mount, a ball mounted on the ball mount, the ball including a central axis, a top and a horizontal axis of rotation, a socket, the socket rotatably mounted on the ball and including a top, and a safety device, the safety device mounted on the ball mount proximate the ball and comprising: a tower, the tower including a housing, the housing including a front, a back and a central aperture; a tongue, the tongue slidably mounted in the housing normal to the tower and including a distal end, a proximal end, an underside, a top and at least two tongue apertures, the tongue apertures extending between the underside and the top; and a pin, the pin releasably retained in the central aperture and one tongue aperture to releasably retain the retention tongue in a position, including an extended position and a retracted position.

In the assembly, the distal end of the tongue may be aligned with the central axis of the ball in the extended position.

In the assembly, the distal end of the tongue may be substantially housed in the housing in the retracted position.

In the assembly, the distal end of the tongue may be coterminous with the front of the housing in the retracted position.

In the assembly, the top of the socket and the underside of the tongue may define a space of about 5 mm to about 10 mm when in the extended position.

In the assembly, the tower may include a right leg and a left leg, the legs attached to the ball mount such that the tongue is in parallel relation to the ball mount.

In the assembly, the pin may include a pin aperture for releasably retaining an R-clip.

The assembly may further comprise the R-clip.

In the safety device, the tower and tongue may be steel.

In yet another embodiment, method of releasably retaining a trailer on a vehicle is provided, the method comprising utilizing a combination comprising a ball mount, a ball mounted on the ball mount, the ball including a central axis, a top and a horizontal axis of rotation, and a safety device, the safety device mounted on the ball mount proximate the ball and comprising: a tower, the tower including a housing, the housing including a front, a back and a central aperture; a tongue, the tongue slidably mounted in the housing normal to the tower and including a distal end, a proximal end, an underside, a top and at least two tongue apertures, the tongue apertures extending between the underside and the top; and a pin, the pin releasably retained in the central aperture and one tongue aperture to releasably retain the retention tongue in a position.

In yet another embodiment, a method of modifying a trailer hitch is provided, the trailer hitch including a ball mount, the method comprising attaching a safety device to the ball mount, the safety device comprising: a tower, the tower including a housing, the housing including a front, a back and a central aperture; a tongue, the tongue slidably mounted in the housing normal to the tower and including a distal end, a proximal end, an underside, a top and at least two tongue apertures, the tongue apertures extending between the underside and the top; and a pin, the pin releasably retained in the central aperture and one tongue aperture to releasably retain the retention tongue in a position.

In yet another embodiment, a method of impeding disengagement of a trailer from a trailer hitch is provided, the trailer hitch including a ball mount with a ball mounted thereon, the ball including a central axis, a top and a horizontal axis of rotation, the trailer including a socket rotatably engaged on the ball a socket and including a top, the method comprising: attaching a safety device to the ball mount, the safety device comprising: a tower, the tower including a housing, the housing including a front, a back and a central aperture; a tongue, the tongue slidably mounted in the housing normal to the tower and including a distal end, a proximal end, an underside, a top and at least two tongue apertures, the tongue apertures extending between the underside and the top; and a pin, the pin releasably retained in the central aperture and one tongue aperture to releasably retain the retention tongue in a position; and sliding the tongue into an extended position over the top of the socket.

The method may further comprise aligning the distal end of the tongue with the central axis of the ball.

The method may further comprise adjusting the tower such that the top of the socket and the underside of the tongue define a space of about 5 mm to 10 mm.

In another embodiment, a trailer hitch assembly is provided, the assembly comprising a ball mount, a ball mounted on the ball mount, the ball including a central axis, a top and a horizontal axis of rotation, a socket, the socket rotatably mounted on the ball and including a top, and a safety device, the safety device mounted on the ball mount proximate the ball and comprising: a tower, the tower including a housing, the housing including a front, a back and a central aperture; a tongue, the tongue slidably mounted in the housing normal to the tower and including a distal end, a proximal end, an underside, a top and a tongue aperture, the tongue aperture extending between the underside and the top; and a pin, the pin releasably retained in the central aperture and the tongue aperture to releasably retain the retention tongue in an operational position.

In the assembly, the distal end of the tongue may be aligned with the central axis of the ball in the operational position.

In the assembly, the top of the socket and the underside of the tongue may define a space of about 5 mm to about 10 mm when in the extended position.

In the assembly, the tower may include a right leg and a left leg, the legs attached to the ball mount such that the tongue is in parallel relation to the ball mount.

The assembly may further comprise a plurality of balls, and the safety device comprising a first, second and third tower, the second and third towers including a second and third housing, respectively, and at least one long leg extending therebetween, the first tower affixed and normal to the at least one long leg.

DESCRIPTION OF THE INVENTION

Except as otherwise expressly provided, the following rules of interpretation apply to this specification (written description, claims and drawings): (a) all words used herein shall be construed to be of such gender or number (singular or plural) as the circumstances require; (b) the singular terms "a", "an", and "the", as used in the specification and the appended claims include plural references unless the context clearly dictates otherwise; (c) the antecedent term "about" applied to a recited range or value denotes an approximation within the deviation in the range or value known or expected in the art from the measurements method; (d) the words "herein", "hereby", "hereof", "hereto", "hereinbefore", and "hereinafter", and words of similar import, refer to this specification in its entirety and not to any particular paragraph, claim or other subdivision, unless otherwise specified; (e) descriptive headings are for convenience only and shall not control or affect the meaning or construction of any part of the specification; and (f) "or" and "any" are not exclusive and "include" and "including" are not limiting. Further, the terms "comprising," "having," "including," and "containing" are to be construed as open ended terms (i.e., meaning "including, but not limited to,") unless otherwise noted.

To the extent necessary to provide descriptive support, the subject matter and/or text of the appended claims is incorporated herein by reference in their entirety.

Recitation of ranges of values herein are merely intended to serve as a shorthand method of referring individually to each separate value falling within the range, unless otherwise indicated herein, and each separate value is incorporated into the specification as if it were individually recited herein. Where a specific range of values is provided, it is understood that each intervening value, to the tenth of the unit of the lower limit unless the context clearly dictates otherwise, between the upper and lower limit of that range and any other stated or intervening value in that stated range, is included therein. All smaller sub ranges are also included. The upper and lower limits of these smaller ranges are also included therein, subject to any specifically excluded limit in the stated range.

Unless defined otherwise, all technical and scientific terms used herein have the same meaning as commonly understood by one of ordinary skill in the relevant art. Although any methods and materials similar or equivalent to those described herein can also be used, the acceptable methods and materials are now described.

Figure 1:
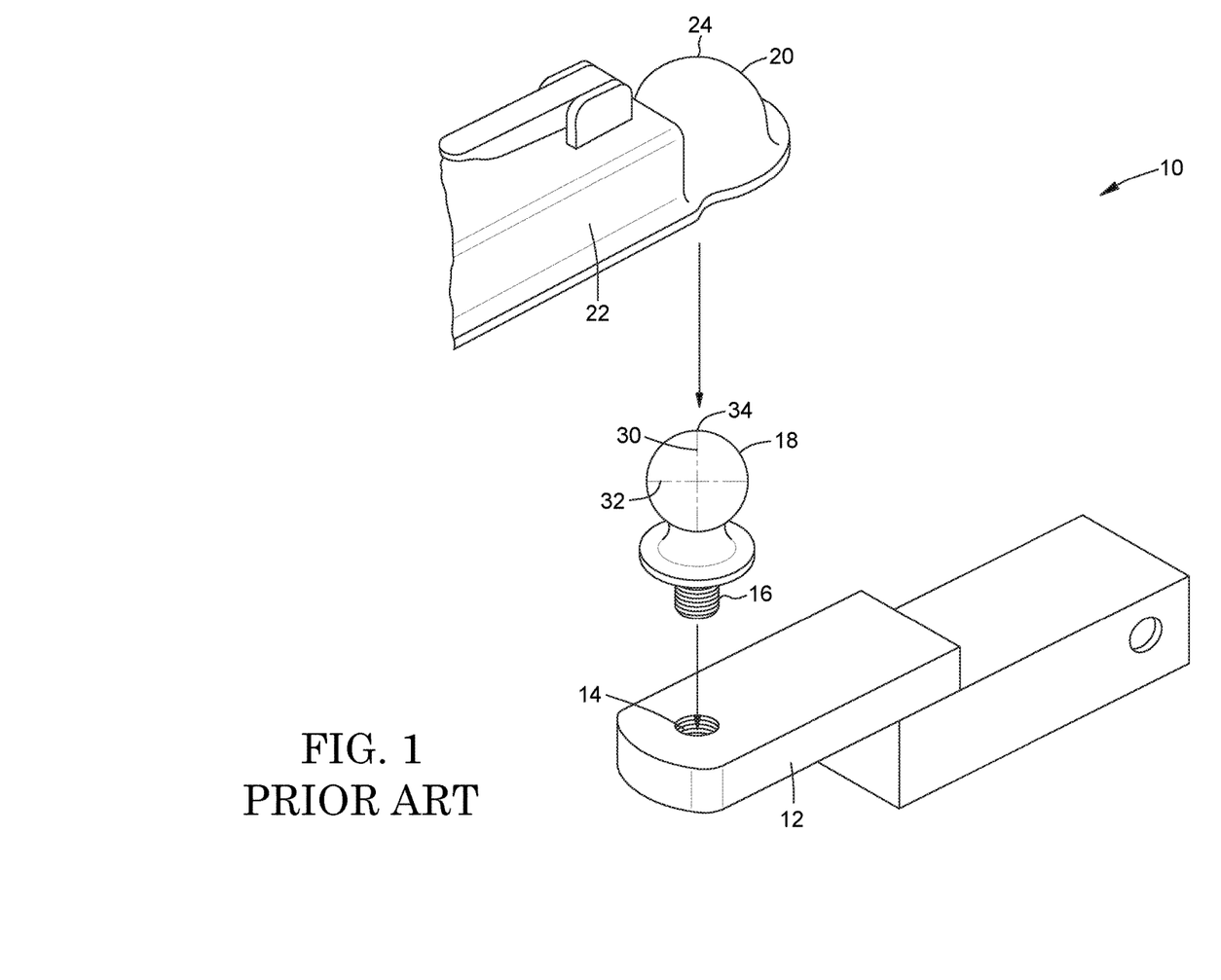
FIG. 1 is a schematic of a prior art trailer hitch connection.

A prior art trailer hitch draw bar, generally referred to as 10 is shown in FIG. 1 and includes a ball mount 12 with a square cross-section to fit into a receiver on a vehicle trailer hitch. An aperture 13 is has threads 14 in the ball mount 12 accepts a threaded bolt 16 of the ball 18. The ball 18 is sized to be retained in the socket 20 which is at the end of the tongue 22 of the trailer. The socket has a top 24. The ball has a central axis 30, a horizontal axis of rotation 32 and a top 34. As would be known to one skilled in the art, there are also drop hitches. The relationship between parts of the hitch and parts of the present technology are the same for a drop hitch as for a straight hitch.

Figures 2A, 2B:
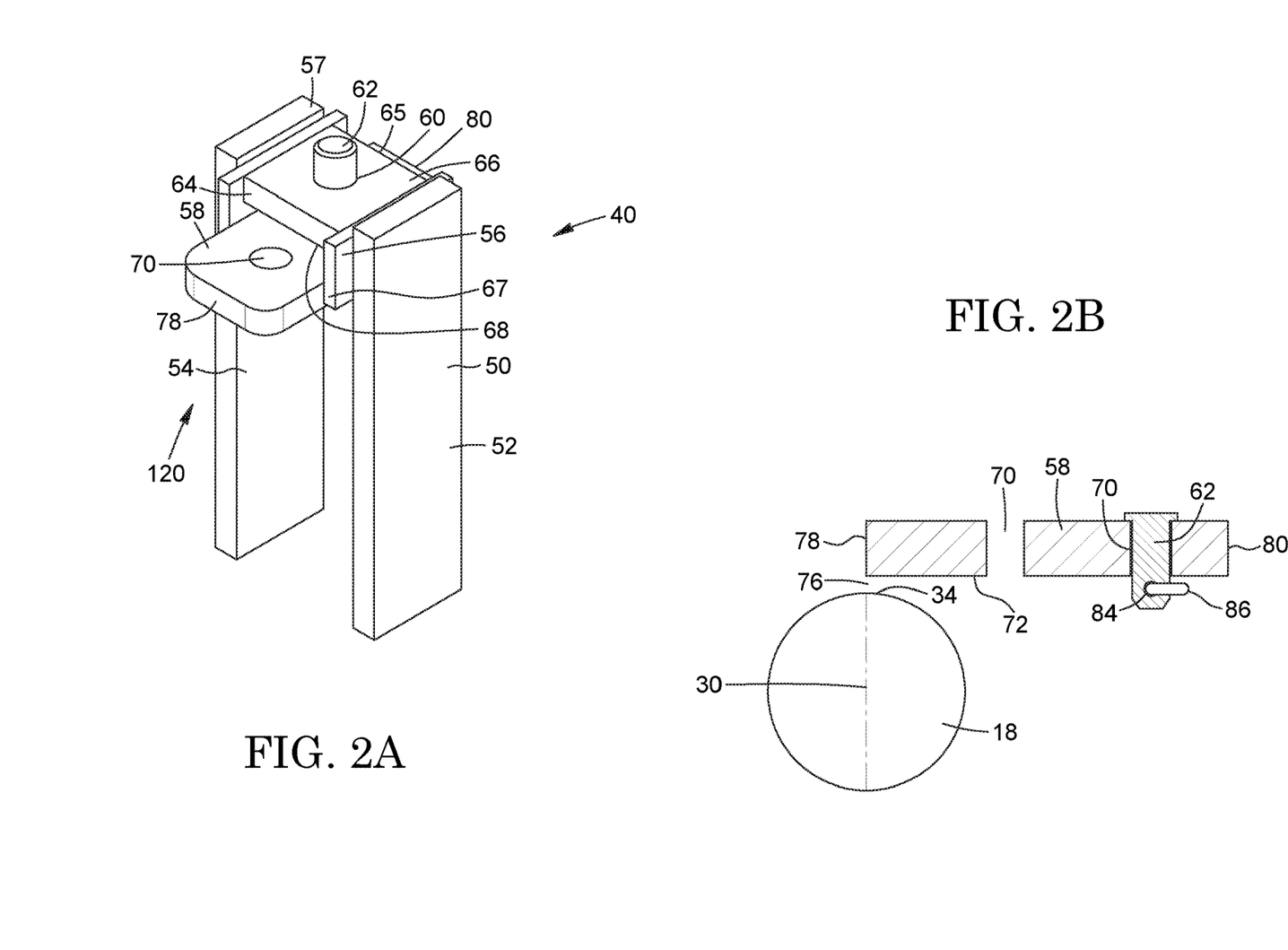
FIG. 2A is a perspective view of the safety device of the present technology.
FIG. 2B is a side sectional view of the tongue and pin and the placement of the tongue in the extended position relative to the ball.

As shown in FIG. 2A, a safety device, generally referred to as 40 has a tower 50 that is sized to attach to the ball mount 12. The tower 50 has a right leg 52 and a left leg 54 and a housing 56 therebetween, spaced above the ball mount 12, at or proximate the top 57 of the tower 50. The housing 56 slidably retains a retention tongue 58. The housing 56 includes a top 66 with a central aperture 60 that accepts a pin 62, a front 64, a back 65, a bottom 67 and a channel 68 therebetween. As shown in FIG. 2B the retention tongue 58 includes at least two tongue apertures 70 to provide at least two positions of the retention tongue 58. The tongue apertures 70 align with the central aperture 60 and are sized to accept the pin 62. The underside 72 of the retention tongue 58 is proximate the top 34 of the ball 18 to define a space 76. Returning to FIG. 2A, the retention tongue has a distal end 78, which may be curved and a proximal end 80. As shown in FIG. 2B, the pin 62 has a distal aperture 84 sized to releasably retain an R-clip 86.

Figure 3A:
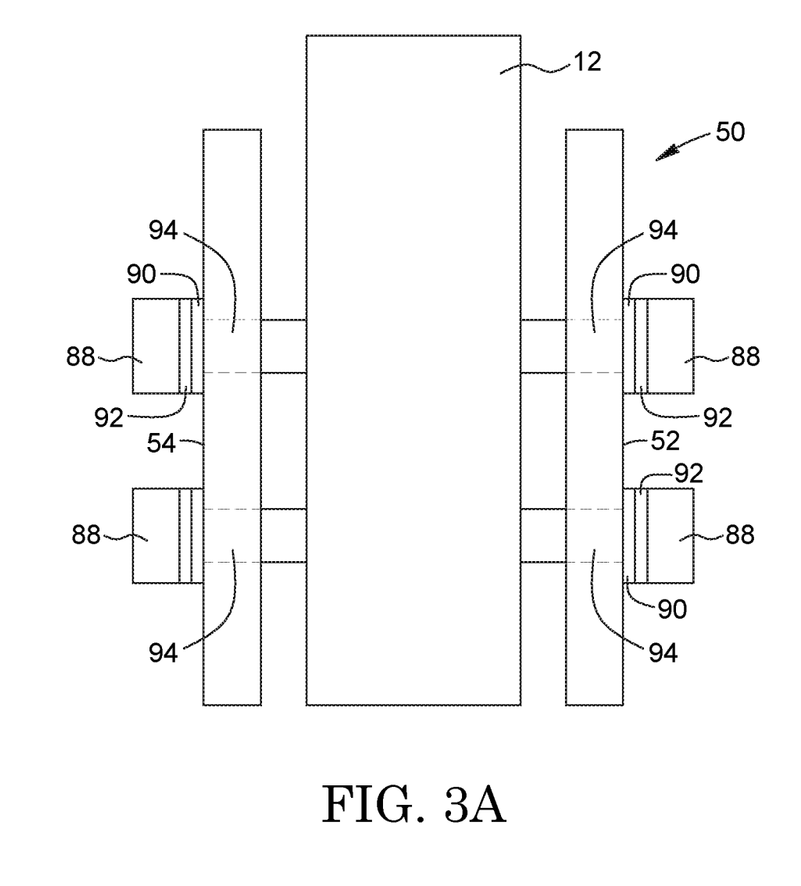
FIG. 3A is a partially exploded top view of the tower and ball hitch.
Figure 3B:
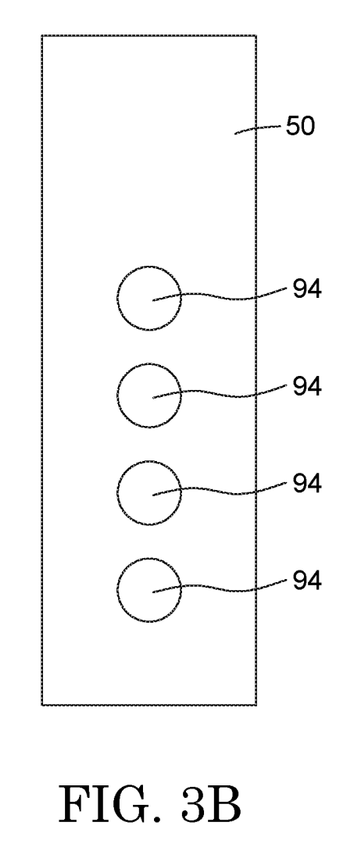
FIG. 3B is a side view of a leg of the tower of the safety device of FIG. 2A.

As shown in FIG. 3A, the tower 52 is retained on the ball mount 12 with bolts 88, each with a washer 90 and lock nut 92. As shown in FIG. 3B, in one embodiment, the tower 52 includes a plurality of threaded side apertures 94 to threadedly accept the bolts 88. The plurality of side apertures 94 allows for adjustment of the height of the tongue 58 relative to the ball 18.

Figure 4:
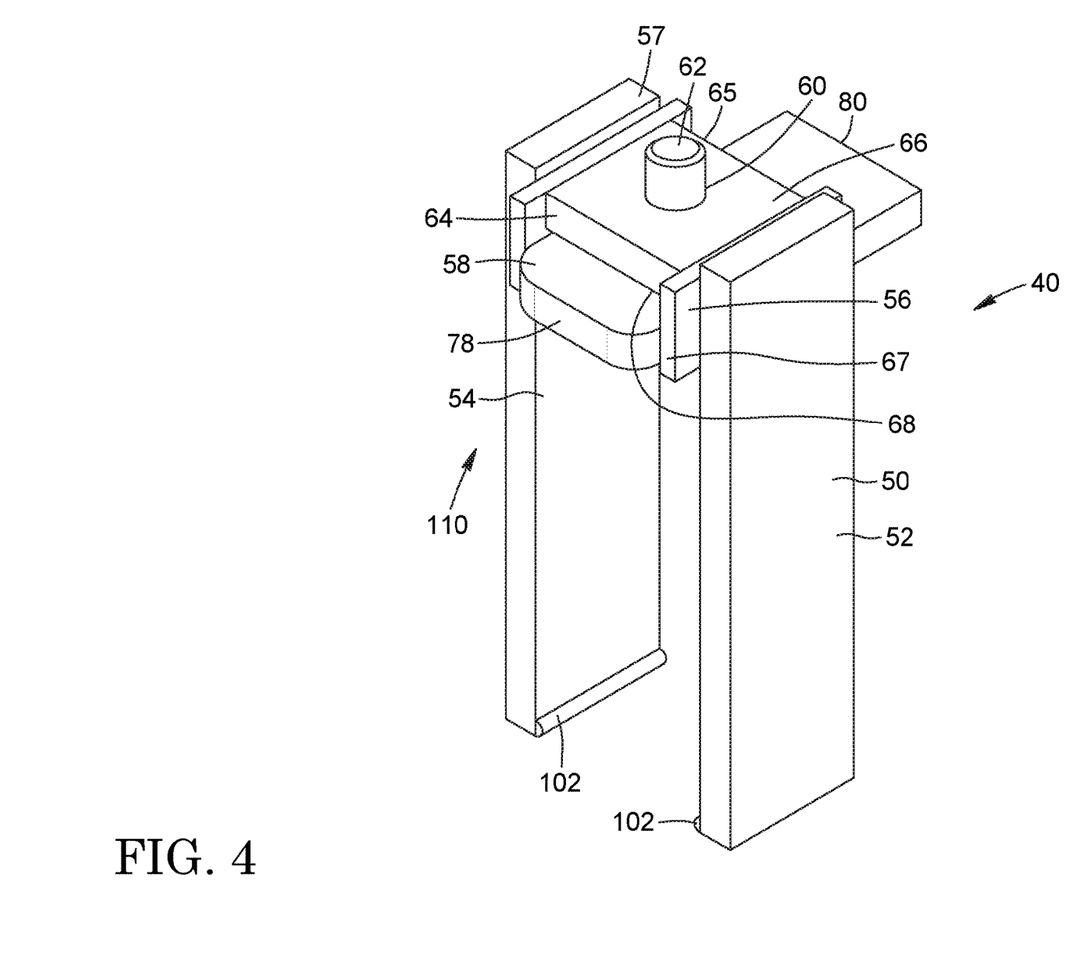
FIG. 4 is a perspective view of an alternative embodiment of FIG. 2A in the retracted position.

As shown in FIG. 4, the tower 52 is welded to the ball mount 12 with welds 102 (ball mount not shown). The retention tongue 58 is in the retracted position, generally referred to as 110. It can be seen that the trailer can be raised and lowered as needed to place the socket 20 on the ball 18, as the tongue 58 is retracted. The distal end 78 is substantially coterminous with a front 64 of the housing 56.

Figure 5:
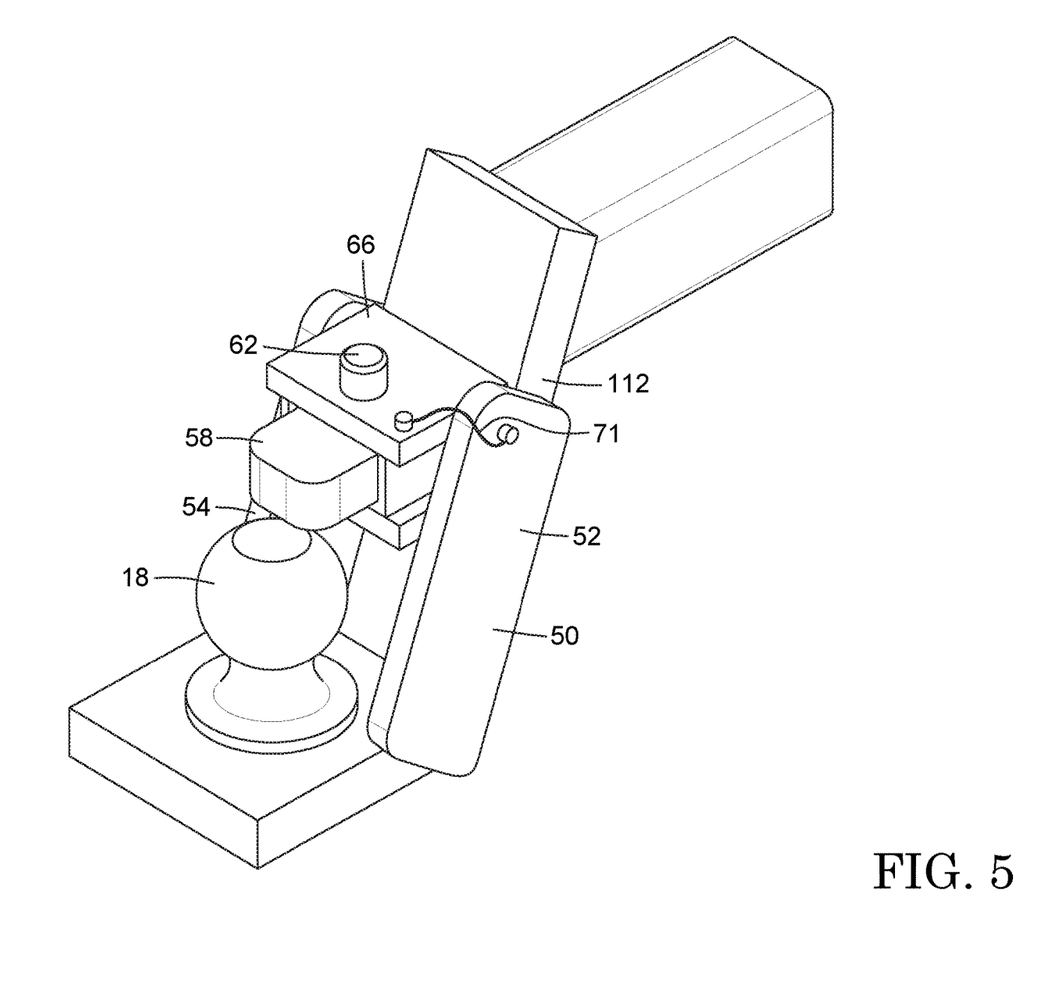
FIG. 5 is a perspective view of an alternative embodiment of FIG. 2A.

As shown in FIG. 5, in an alternative embodiment, the tower 52 is angled to align with a drop hitch 112. The retention tongue 58 has a single tongue aperture 70. As the retention tongue 58 abuts the drop hitch 100, it is not moveable into a retracted position. A tether 71 releasably attaches the retention tongue 58 to the tower 52.

Figure 6:
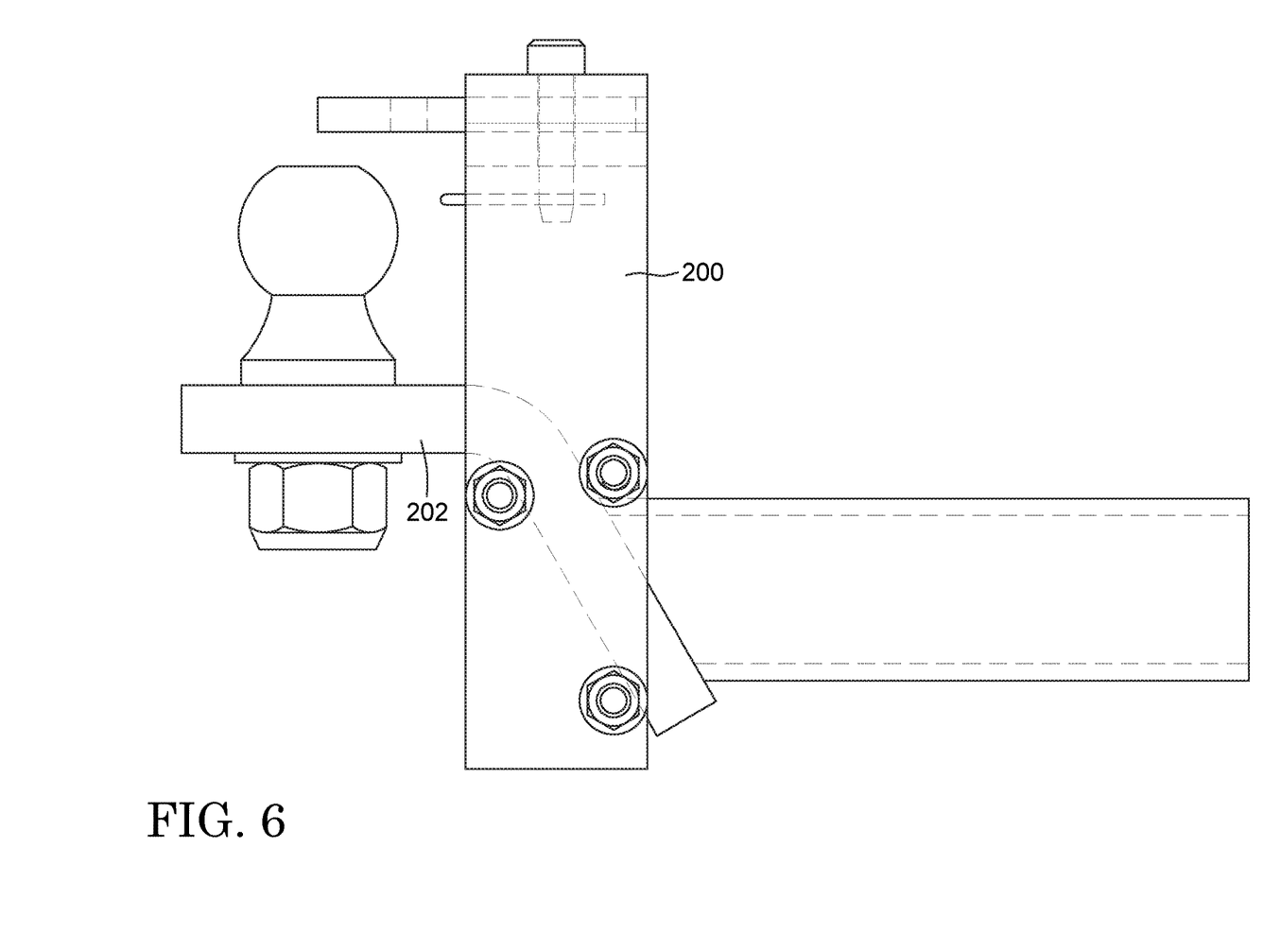
FIG. 6 is a perspective view of another alternative embodiment of FIG. 2A.

As shown in FIG. 6, in another embodiment, the towers 200 are mounted to a raised hitch 202, such as would be used for a light vehicle or an all terrain vehicle.

Returning to FIGS. 2A and 2B, the retention tongue 58 is in the extended position, generally referred to as 120. In this operational position 120, the proximal end 80 of the retention tongue 58 is substantially coterminous with the back 66 of the housing 56. The distal end 78 of the retention tongue 58 is directly over the central axis 30 of the ball 18 and is about 5 mm above the top 34 of the ball 18. Without being bound to theory, this placement achieves three goals: 1. The socket 20 has limited upward travel before striking the tongue 58, hence there is insufficient space for it to disengage; 2. In the event of hard braking or uneven terrain, the trailer and hence the socket 20 is able to pitch in relation to the towing vehicle and hence the ball 18, without becoming jammed; 3. The socket 20 can rotate about the horizontal axis 32 on the ball 18, unimpeded by the safety device 50.

To assemble, the tower 50 is placed such that the distal end 78 of the retention tongue 58 is directly over the central axis 30 of the ball 18 when in the extended position. A thin layer of cardboard or the like, sized to be slightly thicker than the thickness of the socket, is placed between the top 74 of the ball 18 and the underside 72 of the tongue 58. The tower height is then adjusted such that the retention tongue 58 and ball 18 hold the cardboard in place. The cardboard is then removed and the space of about 5 mm to about 10 mm is defined. This space is sufficient to allow the socket 20 to move up and down a very small amount and to rotate freely. The tower 50 is either welded in place or is held in place by the bolts 88. The retention tongue 58 can be moved between the extended position 120 and the retracted position 110 simply by removing the R-clip 86 from the pin 62 and extracting the pin 62 from the central aperture 60 and tongue aperture 70.

The device 40 is preferably made of steel. The tower 50 is about 150 mm tall, about 42 mm wide and about 51 mm long. The legs 52, 54 are each about 9.5 mm thick. The tongue 58 is about 9.5 mm thick, about 38 mm wide, about 90 mm long and has apertures that are about 10 mm in diameter. The top is about 9.5 mm thick, 42 mm wide and about 51 mm long.

While the particular device has been illustrated and described in detail with the help of drawings and foregoing descriptions, such an illustration and description is to be considered as exemplary and not restrictive in character, and is to be understood that it is the presently preferred embodiments of the present technology and is thus representative of the subject matter which is broadly contemplated by the present technology, and that all changes and modifications that come within the spirit of the disclosure are desired to be protected.

The invention claimed is:

1. A safety device for attachment to a ball mount of a trailer hitch, the safety device comprising: at least one tower, the tower including a housing, the housing including a front, a back and a central aperture, the housing mounted proximate a top end of the tower; a tongue, the tongue slidably mounted in the housing normal to the tower and including a distal end, a proximal end, an underside, a top and at least a first tongue aperture and a second tongue aperture, the tongue apertures extending between the underside and the top; and a pin, the pin releasably retained in the central aperture and the first tongue aperture to releasably retain the retention tongue in an operational position and in the central aperture and the second tongue aperture to retain the retention tongue in a retracted position, wherein the distal end of the tongue is housed substantially within the housing and is coterminous with the front of the housing in the retracted position.

2. The safety device of claim 1, wherein the proximal end of the tongue is coterminous with the back of the housing in the operational position.

3. The safety device of claim 2, wherein the tower further includes a right leg and a left leg, each leg for attaching to a side of the ball mount.

4. A trailer hitch assembly, the assembly comprising a ball mount, a ball mounted on the ball mount, the ball including a central axis, a top and a horizontal axis of rotation, a socket, the socket rotatably mounted on the ball and including a top, and a safety device, the safety device mounted on the ball mount proximate the ball and comprising: a tower, the tower including a housing, the housing including a front, a back and a central aperture; a tongue, the tongue slidably mounted in the housing normal to the tower and including a distal end, a proximal end, an underside, a top and at least a first tongue aperture and a second tongue aperture, the tongue apertures extending between the underside and the top and in horizontal, linear relation to one another; and a pin, the pin releasably retained in the central aperture and the first tongue aperture to releasably retain the retention tongue in an operational position, wherein the distal end of the tongue is coterminous with the central axis of the ball in the operational position and the pin is releasably retained in the central aperture and the second tongue aperture to retain the retention tongue in a retracted position.

5. The assembly of claim 4, wherein the distal end of the tongue is substantially housed in the housing in the retracted position.

6. The assembly of claim 5, wherein the distal end of the tongue is coterminous with the front of the housing in the retracted position.

7. The assembly of claim 6, wherein the top of the socket and the underside of the tongue define a space of about 5 mm to about 10 mm when in the operational position.

* * * * *